United States Patent
Fournier et al.

(10) Patent No.: US 9,663,242 B2
(45) Date of Patent: May 30, 2017

(54) PROCESSING OF AIRCRAFT ALARM AND MAINTENANCE MESSAGES

(71) Applicant: THALES, Courbevoie (FR)

(72) Inventors: François Fournier, Toulouse (FR); Stéphanie Peyrat, Toulouse (FR); Rémi Huynh, Toulouse (FR)

(73) Assignee: Thales, Courbevoie (FR)

( * ) Notice: Subject to any disclaimer, the term of this patent is extended or adjusted under 35 U.S.C. 154(b) by 39 days.

(21) Appl. No.: 14/803,044

(22) Filed: Jul. 18, 2015

(65) Prior Publication Data

US 2016/0016671 A1 Jan. 21, 2016

(30) Foreign Application Priority Data

Jul. 18, 2014 (FR) ..................... 14 01622

(51) Int. Cl.

| | | |
|---|---|---|
| *G08B 23/00* | (2006.01) | |
| *B64D 45/00* | (2006.01) | |
| *G01C 23/00* | (2006.01) | |
| *G07C 5/00* | (2006.01) | |
| *H04L 29/08* | (2006.01) | |

(52) U.S. Cl.
CPC ............ *B64D 45/00* (2013.01); *G01C 23/00* (2013.01); *G07C 5/008* (2013.01); *H04L 67/12* (2013.01); *B64D 2045/0075* (2013.01); *B64D 2045/0085* (2013.01)

(58) Field of Classification Search
CPC ................................ B64D 45/00; G01C 23/00
USPC ..................... 340/963, 539.1, 4.3, 945; 701/3
See application file for complete search history.

(56) References Cited

U.S. PATENT DOCUMENTS

| | | | |
|---|---|---|---|
| 4,943,919 A | 7/1990 | Aslin et al. | |
| 7,788,002 B2* | 8/2010 | Yukawa | ............. G05B 23/0267 340/853.2 |
| 2003/0003872 A1* | 1/2003 | Brinkley | ................... G06F 8/61 455/66.1 |

(Continued)

OTHER PUBLICATIONS

David Allen, "Electronic Flight Bag: Real-Time Information Across an Airline's Enterprise," Aero Quarterly, Dec. 31, 2008, XP055183281 <http://www.boeing.com/commercial/aeromagazine/articles/qtr_2_08/AERO_Q208_article4.pdf>.

(Continued)

*Primary Examiner* — Phung Nguyen
(74) *Attorney, Agent, or Firm* — Baker Hostetler LLP (57) ABSTRACT

A computer implemented method for managing alarm and maintenance messages of an aircraft, comprises collecting information relating to the alarm, aircraft status and maintenance messages; transmitting the information collected to an electronic device of EFB or electronic flight bag type, the electronic device being able to correlate the alarm messages with the maintenance messages and to associate the descriptions of the alarms with links and electronic maintenance documents. Developments describe notably the extracting of data from images or audio streams; listening to the communications on an avionics bus between the centralized maintenance system CMS and the printing service Printer and/or ground equipment of AGARS or VHF type; and the establishing of links with the electronic documentation and the use of an electronic flight bag EFB.

13 Claims, 4 Drawing Sheets

(56) References Cited

U.S. PATENT DOCUMENTS

| | | | |
|---|---|---|---|
| 2005/0149238 A1* | 7/2005 | Stefani | G01D 9/005 701/33.4 |
| 2007/0055416 A1 | 3/2007 | Allen | |
| 2008/0215194 A1* | 9/2008 | Bailly | G05B 23/0283 701/3 |
| 2010/0152924 A1* | 6/2010 | Pandit | G01C 23/00 701/3 |
| 2012/0218127 A1* | 8/2012 | Kroen | G08G 5/0034 340/945 |
| 2014/0207314 A1* | 7/2014 | Kou | B64D 43/00 701/14 |

OTHER PUBLICATIONS

Ed McKenna, "Product Focus: Electronic Flight Bags," Jul. 2012, pp. 1-9, XP002717267 <http://www.aviationtoday/com/av/commercial/Product-Focus-Electronic-Flight-Bags__76596.html>.

* cited by examiner

PROCESSING OF AIRCRAFT ALARM AND MAINTENANCE MESSAGES

CROSS-REFERENCE TO RELATED APPLICATION

This application claims priority to foreign French patent application No. FR 1401622, filed on Jul. 18, 2014, the disclosure of which is incorporated by reference in its entirety.

FIELD OF THE INVENTION

The invention relates to the field of avionics, and in particular that of the processing of the alarm and maintenance messages of an aircraft.

BACKGROUND

Aircraft comprise a great deal of electrical, mechanical and computerized onboard equipment. The functioning of this onboard equipment, the processings of which are necessary for proper flight progress, is monitored notably by the crew of the aircraft during the flight. Any failure of one of the items of equipment can be reported either by the crew of the aircraft, or by the item of equipment itself, or by an onboard maintenance system to which the item of equipment can be linked. On returning to the ground, all the data relating to failures, if any, are collected and then analysed by a ground maintenance team.

One of the issues in aircraft maintenance is that of being able to identify as rapidly as possible critical faults of the onboard equipment, as well as their origin so as to afford fast correction, in order to avoid to the utmost the grounding of an aircraft, something that is very expensive for airlines.

In an aeroplane, faults and malfunctions are closely monitored and processed in a specific manner. Several functions are concerned. The fault and maintenance messages form the subject of reports. The flight register or "Logbook" allows the pilot to inform the maintenance personnel of the various malfunctions of the aeroplane. In response to this information provided by the pilot, the maintenance teams consult the paper or electronic documentation in relation to these malfunctions.

In existing systems, as a function of the context specific to an aeroplane or in response to the noting of one or more alarms displayed in the cockpit, the pilot must manually fill in the paper or electronic logbook. Subsequently, the maintenance personnel conduct various investigations so as to make the link between the information provided by the pilot and the reports or information available within the centralized maintenance system.

In existing systems, the maintenance operations are generally guided and conducted by entirely manual actions on the part of the pilot and the maintenance personnel.

These existing solutions are not optimized, may be slow and cause risks of errors.

There exists a need for schemes and systems for managing faults, alerts and alarms in an optimal manner with a view to the ground maintenance operations.

SUMMARY OF THE INVENTION

There is disclosed a computer implemented method for managing alarm and maintenance messages of an aircraft, comprising the steps consisting in collecting or receiving information relating to the alarm, aircraft status and maintenance messages; and transmitting the information collected to an electronic device of EFB or electronic flight bag type, the said electronic device being able to correlate the alarm messages with the maintenance messages and to associate the descriptions of the alarms with links and electronic maintenance documents.

In a development, the step of collecting the information comprises the acquisition of one or more images of the onboard avionics equipment and the subsequent extraction of this information from the said images.

The extraction of data (for example textual) can be done by extracting data from images (so-called "scraping"). Data such as text (by OCR, Optical Character Recognition), numerical values, cursor or dial positions, etc. may be extracted. Extractions of data or information from audio streams are also possible (separately or in combination).

In a development, the step of collecting the information comprises listening to communications on an avionics bus between a centralized maintenance system CMS and a printing service Printer and/or ground equipment of AGARS or VHF type.

In a development, the method furthermore comprises a step of transmitting the data collected from the avionics bus to an EFB or electronic flight bag.

In a development, the method furthermore comprises a step of interpretation by the EFB or electronic flight bag of the data collected from the avionics bus by means of a model of avionics protocols.

In a development, the method furthermore comprises a step of association by the EFB or electronic flight bag of the description of the alarm and maintenance messages, as well as their link with the electronic documentation.

In a development, at least one link is a hyperlink to an electronic document.

In a development, the method furthermore comprises a step of reception by the EFB or electronic flight bag of a selection of an alarm or maintenance message.

In a development, the electronic device of EFB type comprises user interface means and the method furthermore comprising a step of making available by the said user interface means one or more appropriate maintenance procedures and/or documents in relation to the alarm or maintenance message selected.

There is disclosed a computer program product, comprising code instructions making it possible to perform one or more steps of the method, when the said program is executed on a computer.

There is disclosed a system comprising means for implementing one or more steps of the method.

Advantageously, embodiments of the invention make it possible to establish a direct link between the context noted or observed in the aeroplane (alerts, alarms, faults) and the alarms and the actions required by the maintenance personnel. For example, the information relating to the state of the craft can be entered automatically (via the connection with the aircraft systems in particular).

Advantageously, the "logbook", "maintenance report" and "electronic documentation" functions installed and accessible via a portable electronic device of EFB ("Electronic Flight Bag") type can retrieve the aircraft status, the alarms and maintenance messages and propose the appropriate maintenance procedures and/or the documents to the pilot and to the maintenance personnel.

Advantageously, the solution makes it possible to automate and to integrate the information processing chain (alarm, logbook, maintenance, documentation) on earlier-generation aeroplanes.

Advantageously, embodiments make it possible to reduce the cognitive burden of the pilot and maintenance personnel, by unburdening them of tedious manipulations, lessening for example the constraints in regard to data input and thereby allowing more sustained attention in regard to data verification and associated actions.

Advantageously, various embodiments of the invention will be able to be implemented in the onboard equipment, in one or more EFBs, in the flight cabin or on the ground.

Advantageously, the embodiments of the invention allow or aid centralization of the data (alarms, aircraft status, maintenance), appropriate verification and distribution of the verified data, the relevant proposal of the appropriate information in regard to logbook function, maintenance report reporting and electronic documentation.

BRIEF DESCRIPTION OF THE FIGURES

Various aspects and advantages of the invention will appear in support of the description of a preferred but nonlimiting mode of implementation of the invention, with reference to the figures hereinbelow.

DETAILED DESCRIPTION

Certain technical terms and environments are defined hereinafter.

An "Electronic Flight Bag" with acronym or initials EFB corresponds refers to onboard electronic libraries. An electronic flight bag (or electronic flight tablet) EFB is a portable electronic device used by flight personnel (for example pilots, maintenance or cabin staff etc.). An EFB can provide the crew with flight information, helping them to perform tasks (with less paper). In practice, it generally entails an off-the-shelf computer tablet. One or more applications allow the management of information for flight management tasks. These general-purpose computing platforms are intended to reduce or replace the reference material in paper form, often found in the hand luggage of the "Pilot Flight Bag" and whose manipulation may be tedious. The reference paper documentation generally comprises the flight manuals, the various navigation maps and the ground operations manuals. This documentation is advantageously rendered paperless in an EFB. Furthermore, an EFB can host software applications specially designed to automate operations conducted manually in normal time, such as for example takeoff performance computations (computation of limit speed, etc.).

Various classes of EFB hardware exist. Class 1 EFBs are portable electronic devices (PEDs), which are normally not used during takeoff and the disembarkation operations. This class of device does not require an administrative process of particular certification or authorization. EFB devices of class 2 are normally disposed in the cockpit, e.g. mounted in a position where they are used in all the flight phases. This class of devices requires prior authorization of use. Class 1 and 2 devices are considered to be portable electronic devices. Fixed installations of class 3, such as computing media or fixed docking stations installed in the cockpit of aircraft, generally demand the approval and a certification on the part of the regulator.

The acronym (or initials) FMS corresponds to the terminology "Flight Management System" and refers to the flight management systems of aircraft. During flight preparation or during rerouting, the crew input various items of information relating to the progress of the flight, typically by using an FMS aircraft flight management facility. An FMS comprises input means and display means, as well as computation means. An operator, for example the pilot or the copilot, can input via the input means information such as RTAs, or "waypoints", associated with route points, that is to say points vertically above which the aircraft must pass. The computation means make it possible notably to compute, on the basis of the flight plan comprising the list of waypoints, the trajectory of the aircraft, as a function of the geometry between the waypoints and/or of the altitude and speed conditions.

The acronym MMI corresponds to Man-Machine Interface (or HMI, Human Machine Interface). The inputting of the information and the display of the information input or computed by the display means constitute such a man-machine interface. With known facilities of FMS type, when the operator inputs a route point, he does so via a dedicated display displayed by the display means. This display may optionally also display information relating to the temporal situation of the aircraft in relation to the route point considered. The operator can then input and view a time constraint imposed for this route point. Generally, the MMI means allow the inputting and the consultation of the flight plan information.

The "Flight Warning System" (FWS) is a system for centralized management of alerts. The main functions of the system for centralized management of alerts are the collection of the data of the avionics systems, the detection of alerts, the filtering of alerts and the announcement of alerts. This system is capable of alerting the crew, of advising of the defects of the aeroplane and of listing for the crew the procedures to be applied in response to the alerts displayed by the system. A centralized system for managing alerts constitutes an advance with respect to reports of alerts by sub-systems that did not afford the crew an overall view if several alerts were to arise concomitantly. Furthermore, the system for centralized management of alerts comprises the means for dispatching the detected and processed alerts to a flight data recording system as well as to a maintenance system of the aircraft and for synchronizing the audio messages associated with the alerts. The avionics systems also host their own mechanism for detecting functional anomalies whose result is thereafter transmitted directly to the alerts management function. More generally, one distinguishes the "Monitoring" part, that is to say the part for monitoring the functional anomalies, which is hosted mainly in the avionics systems and partially in the alerts management function and the "Consolidation" function which is hosted in the alerts management system which, with a monitoring result, according to the flight conditions, associates an alert.

The system called the "Centralized Maintenance System" (CMS) ensures in particular the maintenance of an aircraft on the ground, which maintenance comprises various steps, comprising firstly the filling in by the onboard personnel of a flight register, or "Logbook" as it is known, listing the set of alarms, anomalies, or other events noted by the crew during the flight. All recent aircraft furthermore comprise so-called BITE equipment, the acronym standing for "Built- In Test Equipment", whose function is to carry out tests on the onboard equipment for the purposes of diagnosis and storage of the events and alarms that have arisen during the flight. After the flight, the centralized maintenance system of the aeroplane, of the CFDIU ("Centralized Fault Display Interface Unit") or CMC ("Centralized Maintenance Computer") type, generally establishes a flight report, called PFR for "Post Flight Report". Subsequently, the intervention of the maintenance personnel is based on the consideration of the Logbook, of the tests carried out by the BITE function, of the PFR, and optionally of other elements related to the general state of the aircraft, such as deduced from the status of the onboard sensors and which is accessible by way of reports of the ALMS ("Aircraft Condition & Monitoring System") type. The events mentioned in the Logbook and the PFR may demand maintenance operations. After having consulted the document which creates an inventory of the necessary and sufficient equipment with a view to performing a flight, a document referred to by the acronym MEL standing for "Minimum Equipment List", the maintenance personnel may deduce the necessity or otherwise to perform maintenance operations in the immediate future. If diagnosis actions have to be undertaken, they are summarized in a manual often called the FIM for "Fault Isolation Manual" or the TSM for "Troubleshooting Manual". The maintenance personnel then have at their disposal various documentary sources, generally dispersed, and several levels of documents detailing the procedures and the various individual tasks to be undertaken. The procedures are detailed in documentation referred to by the acronym AMM standing for "Aircraft Maintenance Manual". When maintenance operations have to be carried out, "Jobcards" are printed: they comprise the set of tasks that a given maintenance operator has to achieve. "Check-lists" are also produced: they comprise a list of actions or of verificatory checks allowing the maintenance operator to make sure of the correct performance of his tasks. Finally, the maintenance operator, after having carried out his duties, is generally required to fill in a "Workreport", which corresponds to a sheet summarizing the set of tasks actually performed by the operator.

Figure 1:
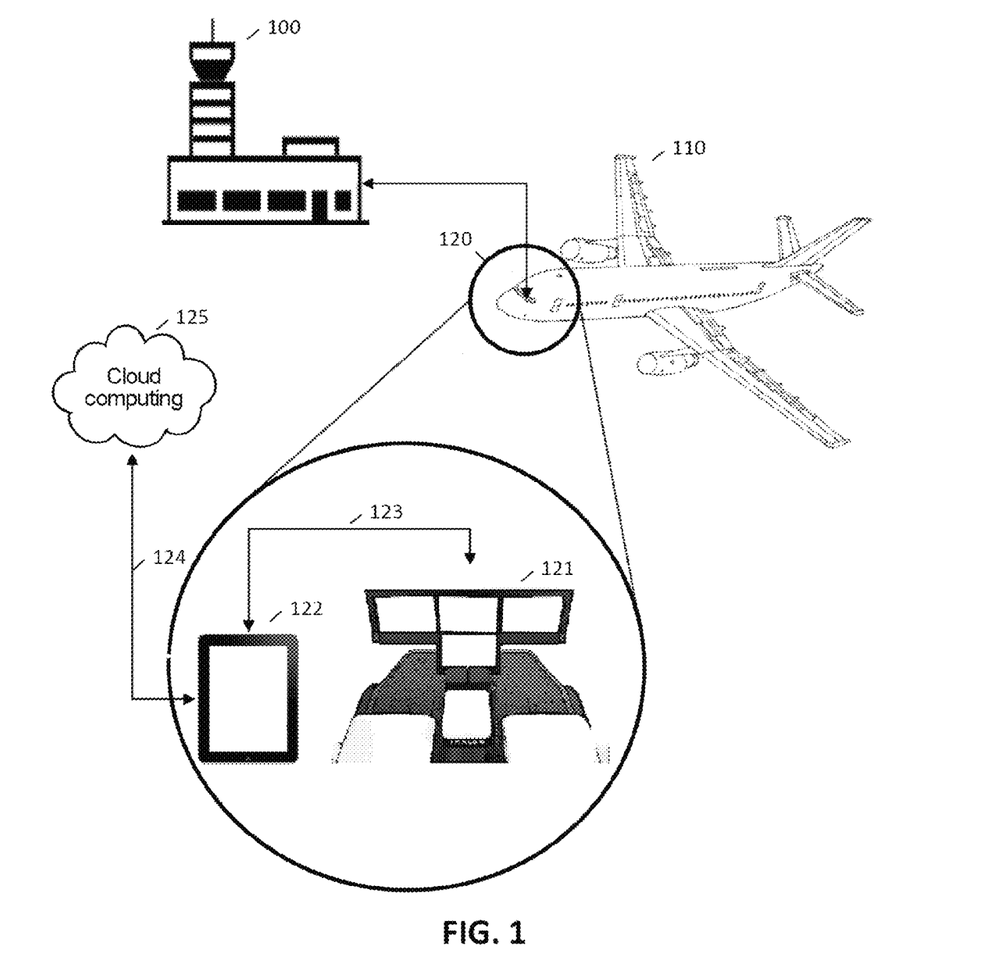
FIG. 1 illustrates the global technical environment of the invention.

FIG. 1 illustrates the global technical environment of the invention. Avionics equipment or airport means 100 (for example a control tower linked with the air traffic control systems) are in communication with an aircraft 110. An aircraft is a means of transport capable of deploying within the terrestrial atmosphere. For example, an aircraft can be an aeroplane or a helicopter (or else still a drone). The aircraft comprises a flight cabin or a cockpit 120. Within the cockpit are situated piloting equipment 121 (so-called avionics equipment), comprising for example one or more onboard computers (means of computation, of saving and of storing data), including an FMS, means of display or viewing and inputting of data, communication means, as well as (optionally) haptic feedback means. An EFB 122 may be situated onboard, in a portable manner or integrated into the cockpit. The said EFB can interact (bilateral communication 123) with the avionics equipment 121. The EFB can also be in communication 124 with external computing resources, accessible by the network (for example cloud computing 125). In particular, the computations can be performed locally on the EFB or partially or totally in the computation means accessible by the network. The onboard equipment 121 is generally certified and regulated while the EFB 122 and the connected computing means 125 are generally not (or to a lesser extent). This architecture makes it possible to inject flexibility on the side of the EFB 122 by ensuring a controlled security on the side of the onboard avionics 121. Several EFBs may be on board.

Figure 2:
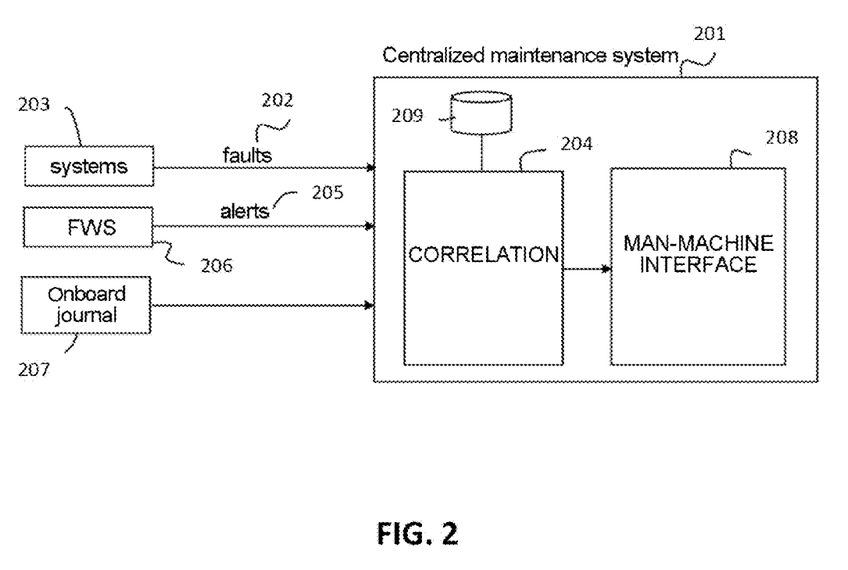
FIG. 2 schematically illustrates the structure and the functions of a centralized maintenance system of known CMS type.

FIG. 2 schematically illustrates the centralized maintenance facility structure and functions according to the prior art. The CMS 201 for "Centralized Maintenance System" receives the following data as input: fault indicators 202, originating from systems or equipment 203 of the aircraft; alerts 205 originating from an FWS 206 of the aircraft, an onboard journal 207 or logbook kept by the crew of the aircraft. The CMS 201 performs a temporal correlation 204 of the data received 202, 205, 207. The correlated data are thereafter transmitted to a first man-machine interface 208 of the first CMS 201. The CMS 201 comprises notably a database 209 comprising aircraft configuration data which can be used by the correlation 204 so as to provide additional information associated with the data presented on the man-machine interface 208. A centralized maintenance system such as this allows curative processing of the faults detected in the course of the flight.

Figure 3:
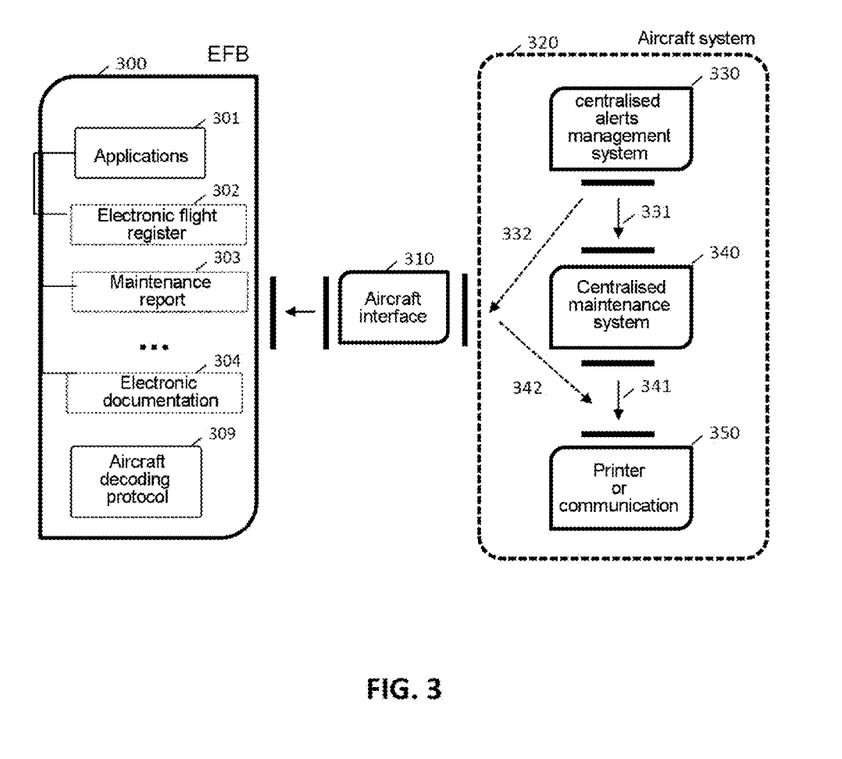
FIG. 3 presents an overall view and examples of steps of the method according to the invention.

FIG. 3 presents an overall view and examples of steps of the method according to the invention. An EFB 300 communicates with aircraft interface equipment 310, which is in interaction with avionics systems 320 ("Aircraft Systems"). The EFB in particular can comprise one or more applications ("app"), each application comprising one or more functions. The EFB can for example comprise an Electronic Logbook 302 application (or function), a Maintenance Report 303 application (or function), an electronic documentation ("Electronic Documentation" 304) application (or function). The avionics systems 320 for their part can comprise, in particular, the Flight Warning System 330 which communicates 331 with the Central Maintenance System 340 which communicates 341 with the Printer or Communication 350. The Flight Warning System can communicate 332 directly with the Aircraft Interface equipment 310, which in its turn can communicate 242 directly with the Printer 350.

The EFB system 300 includes a logbook 302, maintenance report 303 and documentation 304 function. It is linked to the aircraft equipment 310. The EFB retrieves the aircraft context information and the alarms, mainly via the Flight Warning System function through the link between the Flight Warning System 330 and the centralized maintenance system (201, 340) and also via the information of the viewing systems 350. The EFB retrieves the information regarding faults and alarms correlated via the centralized maintenance system (201, 340) through the link between the centralized maintenance system (201, 340) and the printer or communication function 350.

Figure 4:
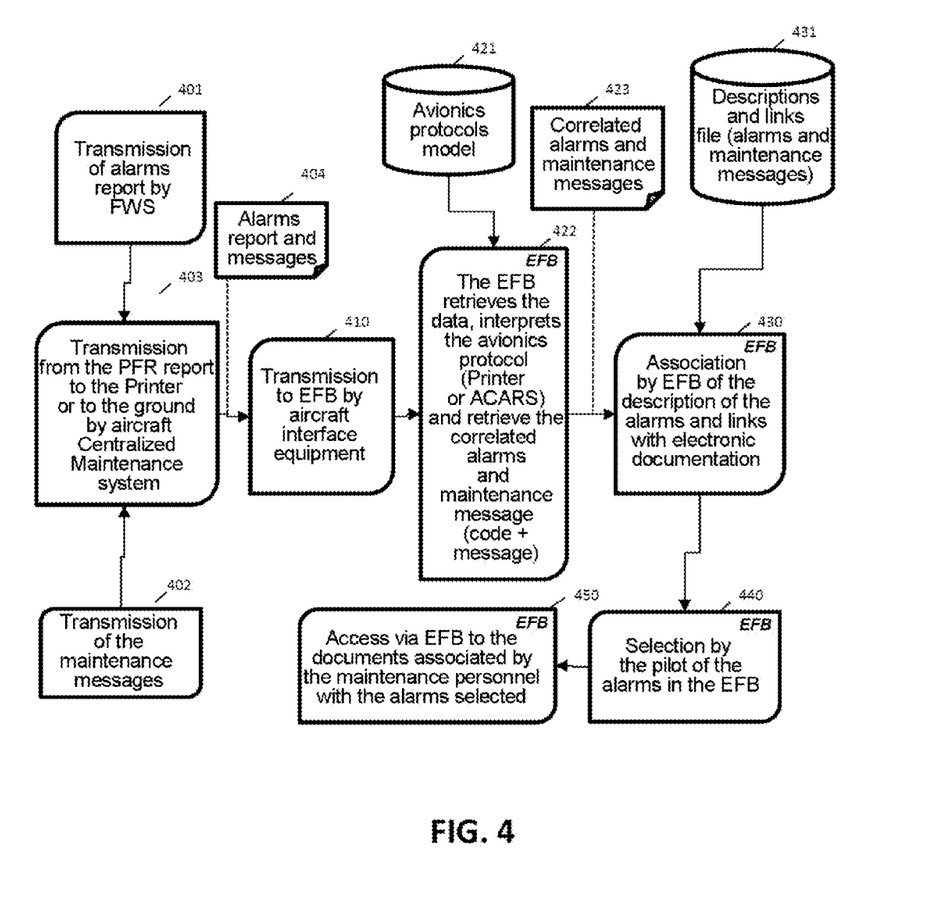
FIG. 4 details certain examples of steps of the method according to the invention.

FIG. 4 details certain examples of steps of the method according to the invention. In step 401, the aircraft system (Flight Warning System) transmits on the avionics bus (for example A429) the report of the alarms. Via the FWS, the data such as those of the "aircraft status" and the "alarms" are collected. Other data can be collected (for example by means of acquisition of images or captures of the screens of the instrument panel or of the onboard MMI equipment, which images or captures allow the recognition of characters or the extraction or the "evasion" of information from the embedded instruments on board). According to one embodiment, the information can be collected (for example) by "spying" on the communication between the Printer function and the centralized maintenance. In step 402 (in parallel, or sequentially, e.g. previously or subsequently), the avionics systems transmit (for example on the avionics bus) the maintenance messages. These maintenance messages or data are for example collected from the data of the "maintenance report" via the centralized maintenance system CMS by "spying" on the communications with the printer Printer or the onboard/ground communication. In step 403, the aircraft system (for centralized maintenance) transmits on the avionics bus the Post Flight Report 404 report grouping together the alarms and the maintenance messages of the current flight for printing (Printer) or for transmission to the ground (AGARS, VHF). In step 410, the aircraft interface equipment retrieves the data of the avionics bus and transmits them to the EFB (via USB or Ethernet for example). The EFB decodes and transmits the aircraft data to the applications installed in the EFB. In step 422, the EFB retrieves the data, interprets the avionics protocol (Printer or AGARS, for example by means of a model of avionics protocols 421) and retrieves the correlated alarms and maintenance message (comprising for example information of code and message type). The correlated alarms and Maintenance messages 423 are processed by the EFB: in step 430, the EFB associates the description of the alarms and maintenance data as well as their link (for example hyperlink) with the electronic documentation (for example by means of a file 431 comprising the descriptions and the links of the alarms and maintenance messages. The "logbook", "maintenance report" and "electronic documentation" functions installed and accessible on the EFB can therefore retrieve the "aircraft status", the "alarms" and the "maintenance messages" and propose the appropriate maintenance procedures and/or the documents to the pilot and to the maintenance personnel. For example, in step 440, the EFB makes the alarms available to the pilot for example via the "Technical Logbook" application installed on the said EFB. The pilot can select one or more alarms (and for example the aircraft status) by way of the logbook. Finally in step 450, the EFB makes available to the maintenance personnel the maintenance messages correlated with the alarms selected by the pilot in the "Technical Logbook" application as well as with the associated documents. Alternatively, the maintenance personnel can open the selected alarms, access the associated maintenance messages (within the report of the centralized maintenance system) and finally access (directly) the aeroplane documentation.

Concerning the mode of collection of the data (401 and 402), a particular embodiment is described hereinafter. A "scraping" operation corresponds to an extraction of information by means of the acquisition of one or more images, and of the subsequent processing of these images. The operation refers to an operation of retrieval or capture of information on a digital object, the said retrieval or capture not being originally scheduled by the digital object. For example, this retrieval of information may comprise the acquisition of one or more images and then the recognition of characters within the captured images.

An "opportunistic" information retrieval or evasion or capture operation such as this makes it possible to establish a link between certified avionics systems (that is to say inter alia controlled and regulated, rather closed, the computer security of which is comparatively more controlled or at the very least monitored) and the non-avionics systems (non-certified open systems, that are more prone to computing attacks but correlatively that evolve faster). In a noteworthy manner, the information retrieval or capture operation is unilateral: the extraction of information is performed from the avionics systems to the open systems (and not the reverse). For example, there is no injection of non-avionics data and/or programs into the avionics systems (or else in a controlled manner).

In the present avionics context, several embodiments are described. In one embodiment, the pilot or the copilot or some other member of the flight personnel triggers an acquisition of images, for example by means of an EFB electronic tablet equipped with a photographic device. The snapshot is thereafter analysed, cropped, and the captured information is extracted from the image. The pre-established knowledge of the type of image captured allows specific recognition. For example, an alarm displayed on the FWS will be in a pre-established and known format. Accordingly the information capture will be optimized. In a variant, the snapshot will be of video type (that is to say acquisition of a succession of still images, the large number of captured images allowing notably optimization of the information capture and/or robustness to the movements of the user carrying the image acquisition means). According to another embodiment, the image acquisition means are mounted in a fixed manner in the cockpit of the aircraft. By this means, information capture or retrieval can be performed in a continuous manner. According to another embodiment, the image acquisition means can correspond to photographic devices or video cameras fixed on virtual or augmented reality headsets.

In this instance, the "alarms" information is available on the pilot's viewing screen. It is also available via the MCDU "Multi Purpose Display Unit" by consulting the reports of the centralized maintenance computer. These two MMI sources allow extraction of the information and its "reinjection" via the EFB. The information of "maintenance message" type is also accessible via the MCDU (by consulting the appropriate reports). Finally, it is possible to undertake the acquisition of images of the malfunctions which are not linked with alarms but which make it possible to back up the pilot's remarks, if any. Although in this case there is no "automatic" correlation with the maintenance messages, this information source will help the understanding and resolution of the maintenance problems.

The present invention can be implemented on the basis of hardware and/or software elements. It may be available in the guise of computer program product on a computer readable medium. The medium may be electronic, magnetic, optical or electromagnetic.

The invention claimed is:

1. A computer implemented method for managing alarm and maintenance messages of an aircraft, comprising the steps of:
    collecting information relating to the alarm, aircraft status and maintenance messages;
    the collecting the information comprising listening to communications on an avionics bus between a centralized maintenance system (CMS) and a printing service Printer and/or ground equipment of ACARS or VHF type; and
    transmitting the information collected to an electronic device of EFB or electronic flight bag type, the said electronic device being able to correlate the alarm messages with the maintenance messages and to associate descriptions of the alarms with links and electronic maintenance documents.

2. The method according to claim 1, the step of collecting the information comprising an acquisition of one or more images of onboard avionics equipment and a subsequent extraction of this information from the said images.

3. The method according to claim 2, further comprising a step of transmitting the data collected from the avionics bus to the EFB or electronic flight bag.

4. The method according to claim 3, further comprising a step of interpretation by the EFB or electronic flight bag of the data collected from the avionics bus by means of a model of avionics protocols.

5. The method according to claim 4, further comprising a step of association by the EFB or electronic flight bag of the description of the alarm and maintenance messages, as well as their link with electronic documentation.

6. The method according to claim 5, at least one link being a hyperlink to an electronic document.

7. The method according to claim 5, further comprising a step of reception by the EFB or electronic flight bag of a selection of an alarm or maintenance message.

8. The method according to claim 7, the electronic device of EFB type comprising user interface means and the method furthermore comprising a step of making available by the said user interface means one or more appropriate maintenance procedures and/or documents in relation to the alarm or maintenance message selected.

9. A tangible computer program product, comprising code instructions making it possible to perform the steps of the method according to claim 1, when the said program is executed on a computer.

10. A system comprising means for implementing one or more steps of the method according to claim 1.

11. A computer implemented method for managing alarm and maintenance messages of an aircraft, comprising the steps of:

collecting information relating to the alarm, aircraft status and maintenance messages;

transmitting the information collected to an electronic device of EFB or electronic flight bag type, the said electronic device being able to correlate the alarm messages with the maintenance messages and to associate descriptions of the alarms with links and electronic maintenance documents;

the collecting the information comprising an acquisition of one or more images of onboard avionics equipment and a subsequent extraction of this information from the said images;

transmitting the data collected from an avionics bus to the EFB or electronic flight bag;

interpretation by the EFB or electronic flight bag of the data collected from the avionics bus by means of a model of avionics protocols; and association by the EFB or electronic flight bag of the description of the alarm and maintenance messages, as well as their link with electronic documentation, wherein at least one link being a hyperlink to an electronic document.

12. A tangible computer program product, comprising code instructions making it possible to perform the steps of the method according to claim 11, when the said program is executed on a computer.

13. A system comprising means for implementing one or more steps of the method according to claim 11.

* * * * *